United States Patent [19]

Hill et al.

[11] Patent Number: 4,494,904

[45] Date of Patent: Jan. 22, 1985

[54] SELF-UNLOADING ON-THE-GO FORAGE HOPPER

[75] Inventors: Amos G. Hill, Hesston; Harold K. Garrison, Newton, both of Kans.

[73] Assignee: Hesston Corporation, Hesston, Kans.

[21] Appl. No.: 354,906

[22] Filed: Mar. 4, 1982

[51] Int. Cl.³ .................... B60P 1/04; A01D 90/00
[52] U.S. Cl. ........................... 414/491; 414/523
[58] Field of Search .......... 414/491, 470, 473, 505, 414/523, 528, 919, 398, 469; 56/16.4, 16.6, 28; 198/550, 566, 557; 298/17 R, 17.5, 18, 19 R, 23 D, 7, 23 R, 23 TT; 296/27

[56] References Cited

U.S. PATENT DOCUMENTS

| 2,862,342 | 12/1958 | Fergason | 56/16.6 X |
| 2,997,342 | 8/1961 | Talbert | 298/17 R |
| 3,396,859 | 8/1968 | Vincent | 414/398 |

FOREIGN PATENT DOCUMENTS

| 244818 | 4/1963 | Australia | 56/16.6 |
| 585342 | 11/1958 | Italy | 298/18 |
| 138029 | 10/1981 | Japan | 414/469 |

OTHER PUBLICATIONS

D'Hooghe Harvester Sales Literature.

Primary Examiner—Robert J. Spar
Assistant Examiner—David A. Bucci
Attorney, Agent, or Firm—Schmidt, Johnson, Hovey & Williams

[57] ABSTRACT

The rectangular forage receiving box or hopper of a crop transporting vehicle is stowed in a compacted, generally upright and squared-up position for over-the-road travel, yet may be rotated into a tilted more spacious and functional position for field operations. When in its field operating position, the bottom of the box is inclined upwardly and outwardly toward an unfolded spout along which crop materials can be conveyed to unload the contents of the box on-the-go into a moving truck pulled alongside of the vehicle and beneath the overhanging spout. The conveyor may be selectively deactivated when the truck is filled and until the next empty truck is moved into position, during which intermediate time the harvesting operations may continue and materials may be temporarily accumulated within the box. A special mounting linkage arrangement supports the box on the vehicle frame in such a manner that the center of gravity of the box remains substantially directly above the center of the underlying vehicle frame and between spaced apart ground wheels thereof notwithstanding rotation of the box from its over-the-road orientation to its tilted field operating mode.

9 Claims, 7 Drawing Figures

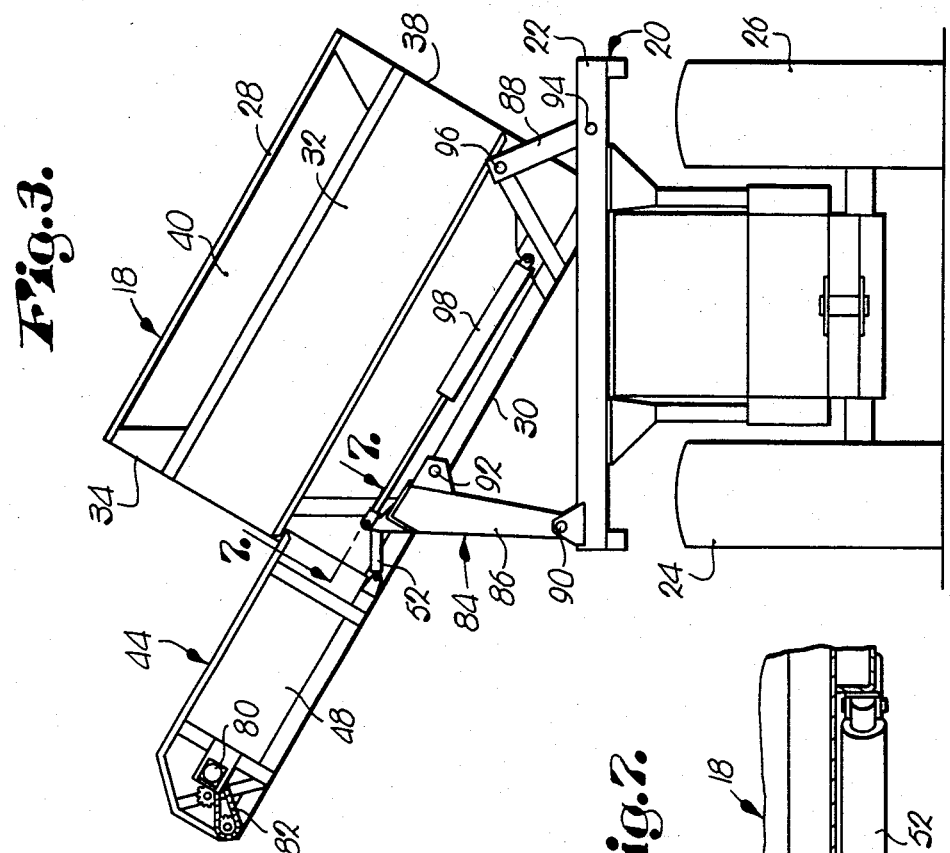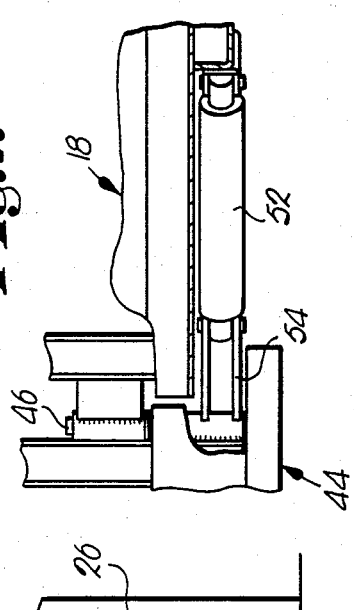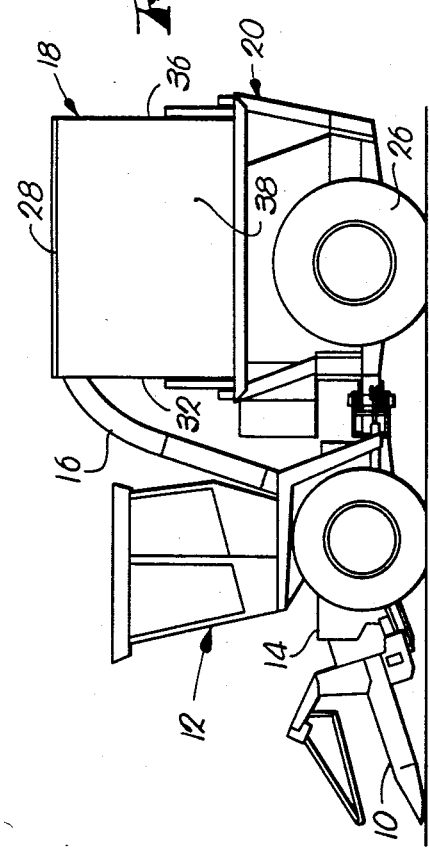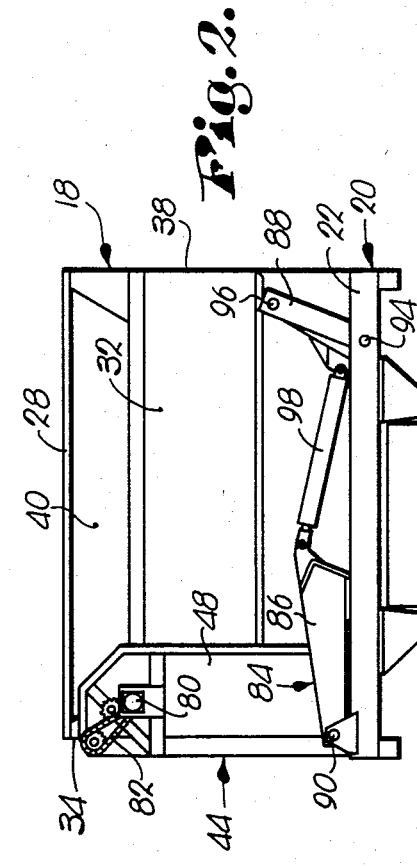

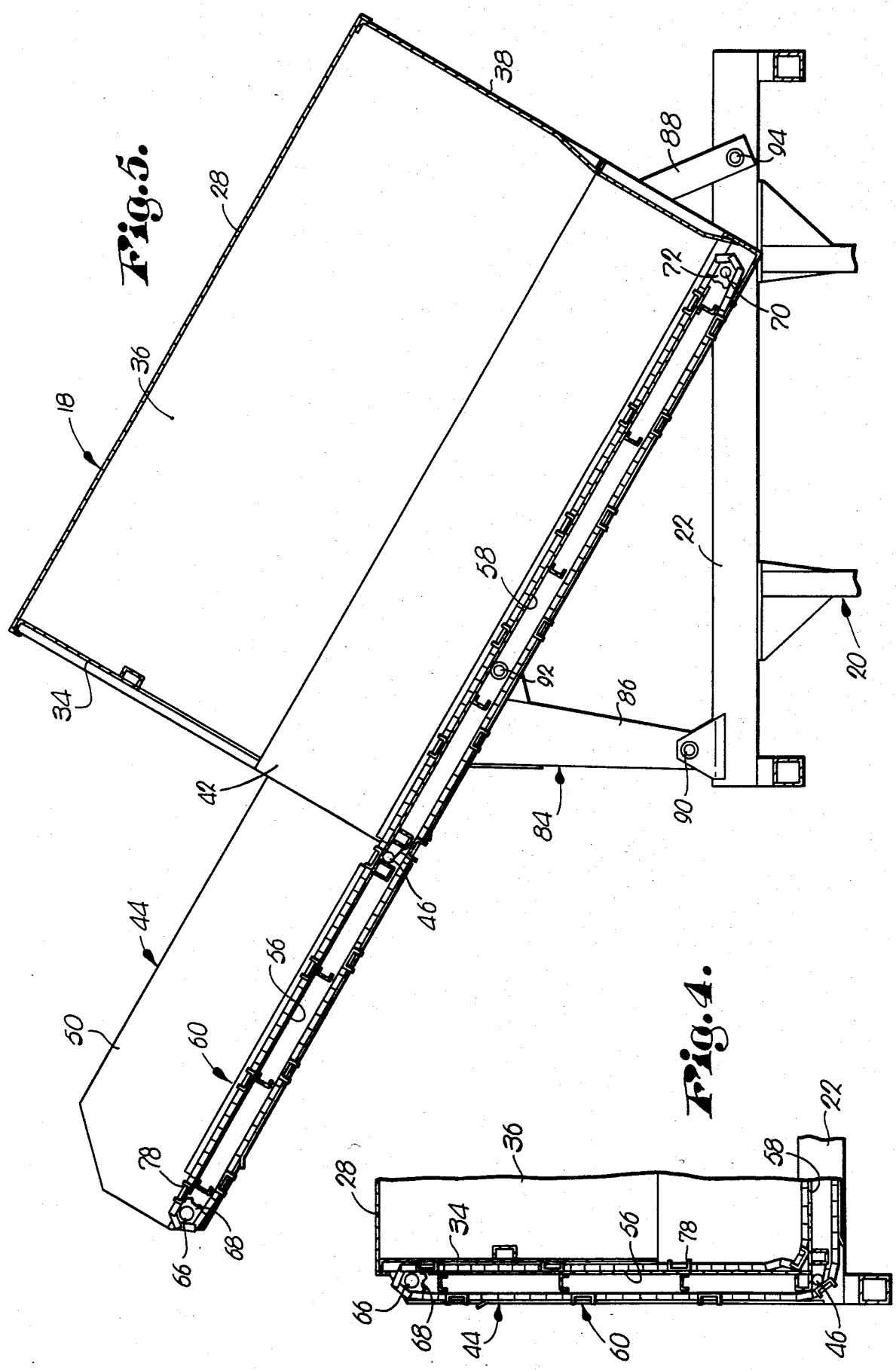

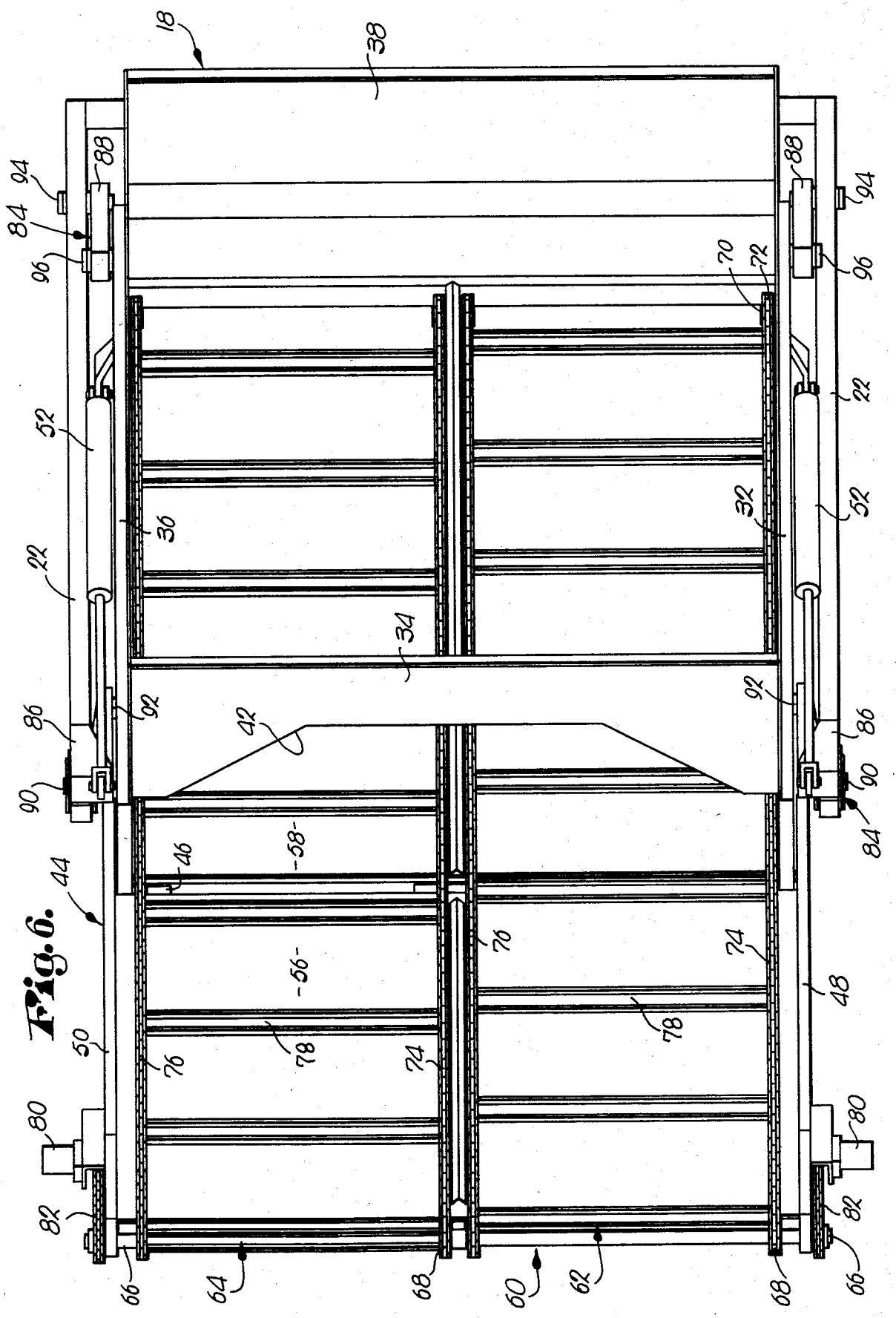

SELF-UNLOADING ON-THE-GO FORAGE HOPPER

TECHNICAL FIELD

This invention relates to the field of transporting and handling harvested crop materials, and, more particularly, to a self-unloading hopper box for forage materials and the like which is designed to make maximum use of the available space as determined by governmental height and width regulations for over-the-road vehicles.

BACKGROUND ART

During the harvesting of forage materials it is customary to transfer the harvested materials from the harvester itself to a truck or wagon which is driven alongside of the harvester while the operation is continuing. When the truck becomes full, however, it is necessary for the harvester to then accumulate and hold the materials on board until the truck has emptied its load and has reappeared in position for receiving the next supply, in the event that harvesting is to be carried out nonstop, which, of course, is quite desirable. In view of the fact that the time when the truck is not available may be substantial, it is desirable to maximize the holding capacity of the harvester in order that field operations need not be temporarily halted while return of the truck is awaited. However, governmental height and width regulations with respect to over-the-road vehicles have a bearing on and restrict the dimensions which can be assumed by the box. Moreover, there are problems in properly filling upright, straight sided box containers when blowing in crop materials from a front opening thereof, as well as problems in conveyor unloading from such boxes. Furthermore, unloading from the bottom of the box, yet placing the point of discharge into the truck or other receiving vehicle at a point which is sufficiently high to avoid interference with the adjacent vehicle is also a significant problem to be dealt with.

SUMMARY OF THE PRESENT INVENTION

Accordingly, one important object of the present invention is to provide a self-unloading, crop transporting hopper box vehicle which is designed to make maximum usage of the available crop holding space insofar as governmental restrictions with respect to height, length and width are concerned, yet which is fully capable of self-unloading into adjacently pulled alongside trucks or other transporting wagons, all without interrupting continuous, on-the-go harvesting operations. Pursuant to this object, the present invention contemplates having a basically rectangular or cubical, boxlike hopper provided with a top, bottom and four sides and having dimensional characteristics that are within the relevant governmental restrictions. Such box is mounted on the mobile frame of the vehicle in such a manner that it can be moved in a generally rotative manner out of a normally upright position in which the sides are vertical and the floor is horizontal to a laterally tilted, unloading position in which the floor slopes upwardly and outwardly at an angle that is appropriate for unloading operations. A spout on one side of the box is normally stowed in a folded up position to serve as a containing portion of the box, but when the box is in its tilted mode for unloading, the spout may be swung down into a position in which it serves as an upwardly and outwardly projecting extension of the inclined box bottom. Operation of a conveyor along the bottom and the spout thereby serves to advance crop materials which have been received by the box out of the latter to an elevated point of discharge at the upper, outward end of the spout. An entry opening in the front side of the box is aligned with a blower spout of the harvester during the time the box is in its tilted mode such that feeding harvested materials into the box may continue uninterruptedly even while the conveyor is activated to unload materials into a truck or a trailer brought alongside of the primary harvesting and transporting vehicle. Deactivation of the conveyor on a temporary basis allows the box to accumulate materials during the interim time that an empty truck or wagon is being awaited. A special skewed, four bar linkage supports the box for its rotative movement on the vehicle frame, such arrangement permitting the center of gravity of the box to remain substantially centered over the vehicle and between its laterally separated ground wheels even during the time that the box is tilted to incline the bottom thereof for unloading purposes.

BRIEF DESCRIPTION OF THE DRAWINGS

FIG. 1 is a schematic side elevational view of forage harvesting equipment employing a hopper box construction in accordance with the principles of the present invention;

FIG. 2 is a front elevational view thereof on an enlarged basis and with the cab portion of the harvester removed, the box being illustrated in its normal, upright position for over-the-road travel;

FIG. 3 is a front elevational view similar to FIG. 2, but with the box tilted into its unloading mode and with the spout lowered into its position for operation;

FIG. 4 is an enlarged, fragmentary vertical cross-sectional view through the hopper box showing the manner in which the spout thereof is folded up into its position for over-the-road travel with the conveyor associated therewith;

FIG. 5 is an enlarged, fragmentary vertical cross-sectional view through the hopper box when the same is in its tilted, unloading mode;

FIG. 6 is a top plan view of the hopper box when it its unloading mode as in FIG. 5, the top wall thereof being removed to reveal details of construction; and FIG. 7 is a fragmentary, enlarged cross-sectional view of the mechanism for raising and lowering the spout.

DETAILED DESCRIPTION

FIG. 1 illustrates a typical example of how the construction of the present invention may be incorporated into a harvester, the particular arrangement illustrated being a self-propelled harvester having a harvesting header 10 carried on the front portion 12 of the harvester, a chopper box 14 situated rearwardly of the header 10 for receiving crop materials therefrom and for reducing the crop stalks into small segments, a blower having a rearwardly directed discharge spout 16 for propelling the crop segments rearwardly, and, a hopper box 18 for receiving materials from the spout 16 and mounted upon a mobile, rear frame portion 20 of the harvester. The frame 20 includes an upper, horizontally disposed box frame 22 located above the two rear ground wheels 24 and 26 of the harvester, the box frame 22 having its lateral extremities substantially coinciding with the lateral extremities of the wheels 24 and 26.

The box 18 includes a top 28, a bottom 30, and four sides 32, 34, 36 and 38 extending between the top 28 and the bottom 30. The front side 32 is provided with an elongated entry opening 40 located adjacent to and just beneath the top 28 and extending substantially across the entire front side 32 for the purpose of admitting crop materials from the blower spout 16 into the box 18.

The side 34 of the box 18 has an exit opening 42 located adjacent its lower extremity which extends substantially the full width of the side 34 to provide for crop discharge. A generally transversely U-shaped unloading spout 44 is open at its two opposite ends and is pivoted at its inner end by hinges 46 to the box 18 below and on opposite sides of the exit opening 42. Front and rear side panels 48 and 50 respectively of the spout 44 are positioned to overlap the corresponding front side 32 and rear side 36 of the box 18 when the spout 44 is in a folded up or raised position as shown in FIG. 2, at which time the spout 44 completely covers the exit opening 42 so as to effectively form a portion of that side of the box 18 corresponding to side 34. A hydraulic piston and cylinder assembly 52 (FIGS. 3 and 7) is connected between the box 18 and a crank 54 on the spout 44 for swinging the latter about the hinges 46 between raised and lowered positions.

When the spout 44 is lowered, the floor 56 thereof becomes aligned with and serves as an extension of the floor 58 associated with the bottom 30 of box 18. An unloading conveyor 60 extends along the two floors 56, 58 and comprises two independently operable, side-by-side chain and slat assemblies broadly denoted by the numerals 62 and 64 respectively. Each of the assemblies 62, 64 has a transverse drive shaft 66 at its outer end carrying sprockets 68 at opposite ends thereof and a driven shaft 70 at the inner end thereof adjacent the intersection of the side 38 of box 18 and the bottom 30. Driven shaft 70 has sprockets 72 at its opposite ends, and a pair of endless chains 74 and 76 are looped around respective sets of the sprockets 68, 72. A series of slats 78 span each pair of chains 74, 76 and ride along the floors 56 and 58 upon activation of the drive shaft 66 of the assembly 62 or 64. The drive shafts 66 of the two assemblies 62, 64 are not interconnected, nor are the driven shafts 70. Each of such drive shafts 66 is powered by its own selectively operable hydraulic motor 80 (mounted on the panels 48 and 50 respectively) which are operably coupled with shafts 66 via chain and sprocket drives 82. Rotation of the shafts 66 when in operation is in a counterclockwise direction viewing FIG. 5 such that the slats 78 progress outwardly toward the outer end of the spout 44.

The box 18 is mounted on the upper box frame 22 of rear frame portion 20 by a four bar linkage means 84 that enables the box 18 to be alternately positionable in either a squared up, over-the-road, transport position as illustrated in FIG. 2 or a laterally tilted, upwardly inclined position as shown in FIG. 3 to facilitate field operations, including on-the-go loading, collecting, and unloading. When the box 18 is in its position of FIG. 2, the lateral sides 34 and 38 thereof are substantially vertically aligned with the outboard extremities of the ground wheels 24, 26, whereas in FIG. 3 it will be noted that portions of the tilted box 18 project beyond such extremities, and the overall height of the unit is increased as a result of the tilted orientation thereof. However, even though the box 18 is oriented in its tilted position in FIG. 3, it will be noted that the center of gravity thereof stays substantially midway between the two ground wheels 24 and 26 to thereby maintain stability of the vehicle during field operations in the tilted condition. This is achieved by virtue of the nature of the linkage 84 which enables the box 18 to effect a generally rotative type movement or motion during its change in attitude from the squared up position to the tilted position thereof, such motion being generally about an axis located inboard of the opposite lateral extremities of the box 18 and between the top 28 and bottom 30 thereof.

The linkage means 84 is a skewed arrangement in order to produce the desired rotational reorientation without substantial shifting of the center of gravity. To this end, the linkage means 84 includes a pair of links 86 and 88 on each of the front and back of the vehicle, each link 86 being pivoted at point 90 at one of its ends to the adjacent end of the box frame 22 and being pivoted at point 92 adjacent its opposite end to the box 18 adjacent the bottom 30 thereof and at a location spaced inboard from the side 34 thereof. On the other hand, each link 88 is shorter than its partner link 86, is pivoted at point 94 to the box frame 22 adjacent the opposite lateral end thereof, and, at its opposite end is pivoted at point 96 to the box 18 at a location spaced above the bottom 30 on the front side 32. Thus, it will be seen that when the box 18 is in its squared up position shown in FIG. 2, the point 96 is spaced considerably above the point 92. A hydraulic piston and cylinder unit 98 is connected between the link 86 on the one hand and a rigid mounting on the front side 32 of box 18 on the other hand, there being one piston and cylinder unit 98 for each of the front and rear sides 32 and 36 respectively of the box 18.

OPERATION

During over-the-road travel, the box 18 is stowed in its squared up position of FIG. 2 with the spout 44 swung up against the box 18 closing the exit opening 42 and effectively forming a portion of the side 34. The conveyor 60 simply "folds" in the middle thereof about the hinges 46 as illustrated in FIG. 4. It will be noted that with the box 18 in its squared up position, and due to the rectangular configuration thereof, all available height and width as provided by governmental regulations and restrictions may be utilized in order that the carrying capacity of the box 18 may be maximized.

When it is then time to begin field operations, the hydraulic cylinder assemblies 98 may be extended whereby to rotate the box 18 from its squared up position of FIG. 2 to its laterally tilted, unloading position of FIG. 3. Before such rotation, at the same time as rotation, or subsequently if desired, the spout 44 may be lowered into its unloading position by simply activating the cylinder assembly 52. In the event that a filling truck or wagon is not yet available, harvesting operations may continue or start nonetheless by simply leaving the conveyor 60 deactivated so that materials blown into the entry opening 40 from the blower spout 16 are simply collected and are not discharged from the box 18. It will be noted that as a result of the inclined attitude of the bottom 30 and the side 38, filling of the box 18 is more fully carried out due to the sloping interior surfaces which are thus provided by the box 18.

When unloading is appropriate, it is only necessary to actuate the conveyor 60 so as to draw the collected materials up the inclined floors 56 and 58 and out over the upper free end of the spout 60 into the awaiting wagon or truck pulled alongside. Such unloading operation may advantageously be carried out on-the-go while harvesting continues, it then being necessary only to deactivate the conveyor 60 once the truck or wagon has been filled, whereupon the box 18 is used once again to accumulate the crop materials harvested during the interim that the truck or wagon is not available. It is also to be noted that due to the inclined interior surfaces provided by the box 18 when the latter is tilted, complete and thorough unloading thereof can be accomplished inasmuch as the contents tend to gravitate down the steeply inclined interiors of sides 38 and 34 onto some portion of the conveyor 60.

The independent operating feature of the two conveyor assemblies 62 and 64 is significant in the event that a front or rear portion, for example, of the truck is in need of filling or at least of receiving an additional supply of material relative to the other portion. Thus, for example, the front conveyor 62 may be deactivated while the rear conveyor assembly 64 remains in operation such that material is delivered into the truck only essentially from the rear half of the spout 44.

It should also be noted that, if necessary, a box full of harvested material can be transported over-the-road essentially totally using the space available by governmental height and width regulations, yet without exceeding such limits. In other words, the box 18 may be filled completely when in its FIG. 3 position and with the spout 44 raised and may thereupon be rotated back down to its squared up, over-the-road position of FIG. 2 so that a maximum pay load is achieved without violating or exceeding governmental restrictions.

Also of substantial significance is the fact that unloading of the hopper box 18 may commence at any selected position thereof between its lowered, roading position and its fully tilted up position as shown in FIG. 3. If desired, the conveyor 60 may be activated when the box 18 is down in its roading position with the bottom 30 essentially horizontally disposed and with the spout 44 likewise essentially horizontally disposed. On the other hand, the conveyor 60 may be activated when the box 18 is fully raised as in FIG. 3, or when the box is at any one of an infinite number of positions between the raised and lowered positions.

This flexibility can be especially beneficial for a number of reasons. For example, it has been found to be desirable to position the unloading spout 44 as closely above the receiving truck or wagon as possible, giving due consideration to variations in terrain which may be encountered by the truck and relative movements that would necessarily arise between the harvester and the truck. By simply activating the cylinder assemblies 98 to the extent necessary, the spout 44 can be custom positioned according to the height of the particular truck or wagon being utilized at that particular unloading operation. Thus, the deleterious effect of winds can be minimized since the crop materials will have a shorter distance to fall into the awaiting truck, and the truck will simply have a tendency to fill better throughout all portions thereof as the crop being unloaded tends to push and shove the previous crop into the corners of the truck.

Unloading on-the-go while at the same time loading the harvested crop is extremely beneficial also in that it effectively increases the capacity of the box 18 which may be restricted by governmental height and width constraints. In this respect, it has been found that due to such constraints, the box 18 typically has a capacity somewhat less than the capacity of the truck or wagon into which the materials may be unloaded. However, due to the fact that not only accumulated materials in the box 18, but also newly harvested materials pass through the box 18 as unloading occurs, the effective capacity is not only that which the box 18 will hold and accumulate, but also that quantity of material which is being harvested and passed through during the unloading sequence. Consequently, even though the capacity of the box 18 may be less than that of the truck into which the crops are unloaded, the capacity of the box 18 can effectively be matched to such truck. This also has the benefit of increasing harvesting efficiencies since the receiving truck is assured of having a full load each time it leaves the harvester; filling the truck only part way and transporting only a partial load to the ultimate unloading site wastes significant time and energy, as well as expense.

Unloading on-the-go also helps fill the truck or other receiving structure more effectively than would otherwise be the case because there tends to be relative displacements between the truck and the harvester with respect to the forward direction of travel, thereby helping to direct the stream of unloading materials somewhat randomly front to rear of the truck as the unloading process is carried out. Moreover, the jostling of the moving truck has the inherent tendency to shake down materials received within the truck supported container, thereby increasing the capacity in that regard.

An additional advantage of having the accumulating capability of the box 18 becomes particularly apparent when the sequence of events taking place in connection with the harvester at the ends of rows is considered. In this regard, it will be noted that it is, of course, necessary for the harvester to make a turn at the end of a row and either proceed in a somewhat different direction or completely reverse its direction of travel and move back across the field in the completely opposite direction from the preceding pass. Without the accumulation feature, it would be necessary for the harvester to first stop at the end of the row and wait until the harvester has delivered to the accompanying wagon or truck all of the materials "in the pipeline" of the harvester, whereupon the harvester and the truck then jockey for position as the turns are made and the vehicles are re-aligned and properly re-established in side-by-side relationship at the head of the next set of rows. Only then can the harvester once again commence harvesting. On the other hand, with the present invention, the position of the receiving truck or wagon can virtually be ignored by the harvester as the end of the row is approached since it is only necessary for the operator to deactivate the unloading conveyor 60 as he reaches the end of the row and to maintain the conveyor 60 deactivated as he makes his turn and commences harvesting along the next set of rows. Materials harvested toward the end of the pass and during the beginning of the next pass are simply accumulated within the box 18 until such time as the truck or wagon once again catches up with the harvester and positions itself properly to receive materials therefrom. Quick turns at the end of rows can be especially significant and important where the rows are unusually short or are found in odd shaped fields, both of such situations requiring more frequent turning than might otherwise be true.

It is also to be noted that the supporting frame 20 for the box 18 is symmetrically located, in a lateral sense, with respect to the centerline of the machine. Thus, it is possible for the frame 20 and the container 18 which it supports to be mounted on its supporting wheels 24, 26 in a 180 degree reversed position from that illustrated in the drawings, if desired. This has the effect of then causing the spout 44 to be projected out from the opposite side of the harvester after the appropriate hydraulic connections have been re-established and the rear of the box 18 properly provided with an opening to receive materials from the spout 16. Consequently, the harvester can be set up for either right or left hand discharge according to the harvesting practices in the particular region or country in which the harvester is to be used.

We claim:

1. A harvester comprising: mobile frame means;

apparatus mounted on said frame means and operable to gather crop materials from a field being traversed by the harvester and to reduce the materials into small segments, said apparatus including a delivery spout through which a stream of the segments is discharged rearwardly from the apparatus;

an enclosed box having a top, a bottom, and four sides extending between said top and bottom, a front side of the box having a crop entry opening therein adjacent said top for receiving the stream of crop segments from the delivery spout;

means mounting said box on said frame means for movement between an upright position in which said sides are generally upright and said bottom is generally horizontal and a laterally tilted position in which said sides are inclined and said bottom is sloped generally upwardly and outwardly;

power means connected for causing said movement of the box between said positions, a lateral side of the box having structure shiftable from a normal raised position in which it serves as a crop confining and containing portion of the box to a lowered position generally aligned with and as an extension of said bottom in which it serves as an outwardly projecting unloading spout for the box; and an unloading conveyor associated with said bottom and said structure and selectively operable to convey crop materials up the inclined bottom and the structure when the box is in its tilted position and said structure is in its lowered position, said delivery spout being positioned forwardly of the box and separate therefrom and within the height dimensions of the latter when the box is in both said positions, said entry opening being so disposed relative to said delivery spout as to permit the continuous, uninterrupted admittance of crop materials into the box during unloading thereof when the box is in its tilted position whereby harvesting, loading, collecting and unloading of crop materials can be carried out on-the-go.

2. A harvester as claimed in claim 1, wherein said mounting means includes apparatus supporting the box for generally rotary movement between said positions thereof generally about an axis inboard of the lateral extremes of the box and between said top and bottom thereof.

3. A harvester as claimed in claim 2, wherein said apparatus includes linkage pivotally coupling the box with said frame.

4. A harvester as claimed in claim 3, wherein said linkage is a skewed, four bar linkage.

5. A harvester as claimed in claim 3, wherein said power means comprises a fluid pressure piston and cylinder unit connected between the box and said linkage.

6. A harvester as claimed in claim 1, wherein said entry opening and the delivery spout are so disposed relative to one another as to permit loading of the box from the delivery spout when the box is in its upright position and during movement thereof between said upright and tilted positions.

7. A vehicle for use in transporting harvested crops comprising:

a mobile frame;

a crop receiving container provided with means for unloading crop materials therefrom;

linkage means mounting said container on the frame for generally rotary movement between a compacted over-the-road position and a more space-consuming, field-operating position generally about an axis located inboard of the lateral extremities of the container and between the top and bottom extremities thereof; and power means connected for causing said movement of the container between said positions thereof, said linkage means including a first, long link pivotally connected between the frame and the container and a second, short link pivotally connected between the frame and the container within the same plane of rotation of the long link, said long link being pivoted to the container at a point lower than the pivot point between the container and the short link when the container is in its compacted position and the points of connection of both links to the frame being at substantially the same height.

8. A vehicle as claimed in claim 7, wherein said power means includes a fluid pressure piston and cylinder unit connected between the container and the four bar linkage.

9. A vehicle as claimed in claim 7, wherein said container has a side thereof which can alternatively be lowered into a laterally outwardly projecting position in which the side serves as an unloading spout for the container, said links being so positioned that said long link is nearer said side than is said short link, whereby to tilt the container in a manner that elevates said side as the container is rotated into said field-operating position thereof.

* * * * *